(No Model.)

W. R. SMITH.
MEANS FOR CONVERTING MOTION.

No. 368,861. Patented Aug. 23, 1887.

WITNESSES
Villette Anderson.
Philip Lemasi

INVENTOR
Wilson R. Smith,
by E. W. Anderson,
Attorney

UNITED STATES PATENT OFFICE.

WILSON R. SMITH, OF BELOIT, WISCONSIN.

MEANS FOR CONVERTING MOTION.

SPECIFICATION forming part of Letters Patent No. 368,861, dated August 23, 1887.

Application filed May 28, 1887. Serial No. 239,692. (No model.)

*To all whom it may concern:*

Be it known that I, WILSON R. SMITH, a citizen of the United States, residing at Beloit, in the county of Rock and State of Wisconsin, have invented certain new and useful Improvements in Means for Converting Reciprocating into Rotary Motion; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
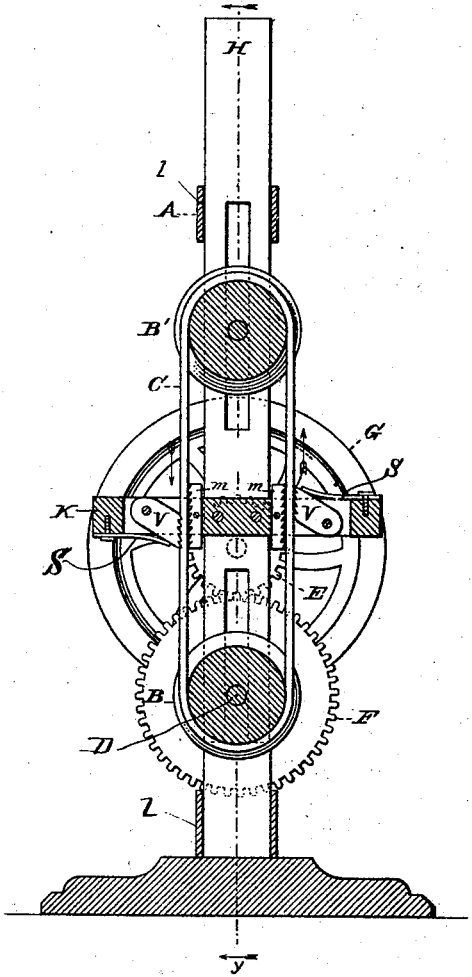
Figure 2:
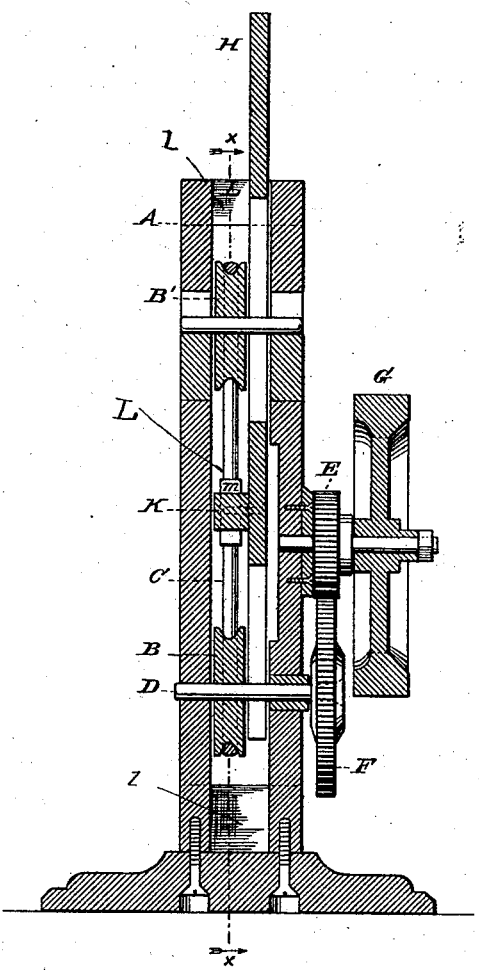

Figure 1 of the drawings is a representation of this invention, and is a vertical section taken where the broken line $x\,x$ is marked on Fig. 2. Fig. 2 is a vertical section taken where the broken line $y\,y$ is marked on Fig. 1.

The object of this invention is to provide a simple and economical device for converting reciprocating into rotary motion; and it consists in the construction and novel combination of parts, as hereinafter set forth.

In the accompanying drawings, the letter A designates a frame or support for the pulleys and gearing and for the reciprocating grip-carrier.

B and B' are pulleys carrying an endless belt C. One of these pulleys, B, is carried on a shaft, D, which is designed, when the movement is in operation, to turn continuously in one direction, thereby driving such machinery as it may be in connection with, as indicated by the gear-wheels E and F and the fly-wheel G.

H represents a reciprocating bar, which extends in the direction of the length of the endless belt, and parallel to its plane in the space L, between the uprights of the main frame, and is held in place partly by the guide-straps $l\,l$ and partly by a guide-recess in the carrier K. To this bar is attached the transverse carrier K, which extends through the opening L, in which the branches of the endless belt pass, as indicated in the drawings. Between these openings the carrier is provided with the bearings $m\,m$, which extend in the direction of the length of the belt, and are placed at a distance from each other which is slightly less than the diameter of the pulley B. Therefore, when the belt is running freely, it will just clear the bearings $m\,m$. These bearings are preferably roughened or serrated.

V V are grips or jaws pivoted to the carrier K, said grips being inclined reversely from each other, as indicated, and extending toward the bearings $m\,m$, respectively, so that the branches of the endless belt are respectively between a bearing $m$ and a grip V. These grips are provided with springs S, which yield in the direction of motion of the belt, and yet serve to close the grips upon the belt sufficiently to cause engagement to be effected by the wedging action of said grips alternately as the carrier is reciprocated by a windmill or other motor. The springs S are therefore lighter and the grips are of small weight to avoid wear of the belt.

The operation is as follows: When the grip-carrier moves in one direction, the grip of one side is caused to press the belt against the bearing $m$ of that side, carrying the belt along, while the opposite branch of the belt is relieved from its bearing $m$ and passes freely by its grip. When the grip-carrier moves in the opposite direction, the first branch of the belt is released and the second branch is engaged by the grip and pressed against its bearing $m$, so that the belt is caused to move continuously in the same direction.

Having described my invention, what I claim, and desire to secure by Letters Patent, is—

The combination, with the endless belt C, the pulleys B B', journaled in the main frame and carrying said belt, the gear-wheels F E and the pulley G, of the reciprocating bar H, adapted to move in guides on the main frame, the slotted carrier-head K, the toothed bearings $m\,m$, secured to said carrier-head, the toothed grips V, pivoted in the slots in the head, and the springs S, bearing on said grips, substantially as specified.

In testimony whereof I affix my signature in presence of two witnesses.

WILSON R. SMITH.

Witnesses:
CHAS. H. BICKNELL,
C. A. ROBINSON.